United States Patent [19]
Campbell

[11] 3,924,189
[45] Dec. 2, 1975

[54] SYSTEM FOR DETERMINATION OF SMALL TUNING ERRORS IN RECEIVERS

[76] Inventor: Kenneth J. Campbell, 632 N. Granados St., Solana Beach, Calif. 92075

[22] Filed: Nov. 1, 1973

[21] Appl. No.: 411,963

[52] U.S. Cl. .............................................. 325/363
[51] Int. Cl.² ....................................... H04B 17/00
[58] Field of Search .................................. 325/363

[56] References Cited
UNITED STATES PATENTS
3,783,388  1/1974  Disinger ............................. 325/363
3,806,811  4/1974  Thompson ........................ 325/363

*Primary Examiner*—George H. Libman
*Attorney, Agent, or Firm*—R. S. Sciascia; G. J. Rubens; J. W. McLaren

[57] ABSTRACT

A system is provided for the determination of small tuning errors in receivers, particularly of the SSB (single sideband) type, where the receiver under test is tunable to a plurality of discrete frequencies differing by an identical frequency separation between adjacent frequencies, and is operative to produce an output at the separation frequency when accurately tuned to any one of the plurality of discrete frequencies. A signal source produces signals of a frequency equal to the frequency separation of the receiver to drive a pulse generator developing pulses at the same frequency that are impressed upon the receiver under test as input signals. Frequency discriminator means is connected to receive the output of the receiver and produces a signal as a function of the frequency deviation of the instantaneous output of the receiver relative to the previously mentioned predetermined frequency. The amplitude of the signal produced by the frequency discriminating means is then visually presented, preferably in the form of frequency deviation from the aforementioned predetermined frequency to indicate the degree of tuning error of the receiver.

4 Claims, 2 Drawing Figures

SYSTEM FOR DETERMINATION OF SMALL TUNING ERRORS IN RECEIVERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many communications equipments currently in use are designed to receive signal information on a plurality of different frequencies. Typically, such a receiver may be tuned to receive signal information from any one of a number of different transmitters functionally operative with different signal networks and multiple diverse sources of information.

For example, particularly in military equipment, such as a receiver aboard a ship, it is desirable to be able to receive signal information from other ships, aircraft, satellites, etc., Thus, such a receiver may be selectively tunable to a plurality of discrete frequencies which differ by an identical frequency separation between adjacent frequencies. For example, the receiver may be tunable to multiples of 1KHz through a range of 9120KHz to 9150KHz in which case the receiver is selectively tunable to 31 different channels such as 9120KHz, 9121KHz, 9122KHz, 9123KHz, 9124KHz, 9125KHz, etc., to channel 9150KHz.

Further, in such conventional receivers it is customary that the receiver is operative to produce an output at the separation frequency when accurately tuned to any one of the plurality of discrete frequencies to which it is selectively tunable. For example, such a receiver may be operative to produce an output tone of 800 Hz when it is accurately tuned to receive any one of the plurality of discrete frequencies which are 800 Hz apart to which it is selectively tunable. Thus, such receivers are operative to provide an audible indication of its approximate tuning status. However, such audible tone does not reliably indicate small errors in receiver tuning since it is most difficult for an operator to aurally estimate small differences in tone. Alternatively, to indicate such frequency deviation visually would require a frequency meter type of device which is relatively complex and expensive.

Currently, the conventional method of determining the precise frequency to which a receiver is tuned is to use a signal generator to develop an appropriate signal which is impressed upon the receiver as its input for producing the appropriate output audio tone such as 800 Hz, as given in the foregoing example; then the frequency of that signal input from the signal generator which produces the appropriate audio output tone, such as 800 Hz, is determined.

One of the principal disadvantages of conventional prior art methods of determining small frequency errors in receiver tuning is the requirement for a signal generator tunable over the full range of a plurality of discrete frequencies to which a receiver may be selectively tuned and usually a frequency meter, as well. Moreover, the signal generator must actually be tuned separately and individually to each of the receiver's plurality of frequencies. This conventional system does not lend itself readily to automatic testing and is relatively cumbersome and time consuming in addition to requiring relatively expensive and complex equipment in the form of a highly accurate signal generator, a frequency meter, and other instrumentation as may be necessary for differing instances.

Accordingly, it is highly desirable that a means be provided for determining the tuning frequency error, particularly of single sideband and continuous wave receivers, which is relatively compact, simple, highly reliable, and readily adaptable to automatic testing techniques.

SUMMARY OF THE INVENTION

The concept of the present invention is directed to a single sideband or continuous wave receiver of the type which is selectively tunable to any one of a plurality of discrete frequencies differing from each other by identical frequency separation between adjacent frequencies, and which is operative to produce an output at the separation frequency when accurately tuned to any one of the plurality of discrete frequencies.

Further, in the customary operation and use of such a receiver tunable to any one of thirty different frequencies ranging from 9120KHz to 9150KHz at frequency separations of 1KHz, it may be presumed that the receiver will be actually tuned to within one-half or less of the frequency separation between adjacent frequencies. That is to say, that where the frequency separation between adjacent frequencies is 1 KHz, as given in the foregoing example, it may be reasonably assumed that such a receiver will always be tuned to within less than 500Hz of the desired frequency.

If a very narrow pulse is fired at the frequency $f_{prf}$, a spectrum envelope of its harmonic components will be produced which is essentially flat and includes spectral lines at all integral multiples of $f_{prf}$. In accordance with the concept of the present invention, if such a narrow pulse is fired at a frequency equal to the identical frequency separation between adjacent frequencies of the receiver, such as 1KHz for the foregoing example, a flat spectrum consisting of 1KHz, 2KHz, 3KHz, . . . nKHz spectral lines will be generated. Such harmonic spectral lines may be referred to as $f_1, f_2, f_3, \ldots f_n$.

Accordingly, in the general case, each allocated receiving frequency should have a corresponding generated spectral line which is a harmonic of the frequency separation.

It may be further demonstrated that the frequency $f_r$, which is the output tone produced by a single sideband receiver when it is tuned accurately for the upper sideband, is $$f_r = f_{usb} - f_c$$

where, $f_{usb}$ = frequency of the upper sideband signal $f_c$ = frequency of the reinserted carrier (equivalent to the frequency to which the receiver is tuned)

When the receiver is tuned exactly and accurately to one of the plurality of discrete frequencies, the frequency of the reinserted carrier will align with one of the generated spectral lines, $f_n$. Under those conditions $f_n + 1$ (the upper sideband signal) when demodulated, will yield an audio output tone signal of predetermined frequency, such as 1000Hz, for example.

However, should the frequency of the receiver differ from the frequency to which it is assigned, $f_c$ will not equal $f_n$ and, as a consequence, the tone produced will not equal 1000Hz.

Accordingly, it follows that the tone produced $f_r$ will equal $$f_r = f_c - (f_n + 1000 Hz)$$

This expression may be rearranged to define receiver tuning error as $f_c - f_n$,
$$f_c - f_n = f_r - 1000Hz$$
Therefore, the determination of the number of Hz difference between $f_r$ and 1000Hz will indicate tuning error of the receiver.

In accordance with the concept of the present invention, a frequency discriminating means connected to accept the output of the receiver, produces a signal as a function of the frequency deviation of the instantaneous output of the receiver from the predetermined frequency output indicative of accurate tuning, such as the frequency 1000Hz given in the foregoing example.

The output of the frequency discriminating means may be impressed upon an indicator which is preferably calibrated in terms of frequency deviation from desired tuning to provide a direct reading of such error. That is to say that, if in the given example, a 1000Hz tone is produced as the output signal of the receiver, a zero frequency deviation will be shown on the indicator; however, a 950Hz tone output from the receiver will produce an indicated frequency deviation of 50Hz, and similarly other deviations from the 1000Hz output of the receiver will produce commensurate indications of frequency deviation from the accurate tuning point.

It should be noted also that the above concept of operation will hold true for any $f_{prf}$, or multiple of $f_{prf}$, whether it be upper or lower sideband.

In summary, the concept of the present invention contemplates a system for the accurate and immediate determination of small tuning errors in SSB receivers where such receivers are tunable to a plurality of discrete frequencies differing by an identical frequency separation between adjacent frequencies, and are operative to produce an output of the separation frequency when accurately tuned to any one of the plurality of discrete frequencies.

A source for producing signals at a frequency equal to the frequency separation is provided and narrow pulses of that frequency are impressed upon the receiver as its input signal. A frequency discriminating means is connected to receive the output of the receiver and produce a signal as a function of the frequency deviation of the instantaneous output of the frequency from the predetermined frequency as described. A suitable means, preferably of the meter indicating type, is provided to respond to the amplitude of the signal produced by the frequency discriminating means to visually indicate a direct reading of tuning errors of the receiver under test, preferably calibrated in terms of frequency tuning error.

Accordingly, it is a primary object of the present invention to provide a system for determining small tuning error of receivers without the use of a tunable signal source.

Another most important object of the present invention is to provide such a system for the determination of small tuning errors in receivers which is readily adaptable to automatic testing techniques.

A further important object of the present invention is to provide such a system for the determination of small tuning errors in receivers which is especially adaptable for single sideband receivers.

A further object of the present invention is to provide such a system for the determination of small tuning errors in receivers which significantly simplifies both the method and equipment requirements as compared to prior art systems and methods designed to achieve comparable results.

Another object of the present invention is to provide such a system without requiring the use of a frequency meter.

Yet another object of the present invention is to provide such a system which is readily adapted to utilize advanced integrated circuit techniques.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

As previously explained, the present invention is directed to the type of receiver which is selectively tunable to a plurality of discrete frequencies differing from each other by identical frequency separation between adjacent frequencies and, further, is operative to produce an output at the separation frequency when accurately tuned to any one of those pluralities of discrete frequencies. Thus, such a receiver will produce an output as a single predetermined frequency $f_r$ when accurately tuned to any one of the discrete frequencies to which it is selectively tunable. That tone or signal, $f_r$, when produced by a single sideband receiver, is for the upper sideband.
$$f_r = f_{usb} - f_c$$
where, $f_{usb}$ = frequency of the upper sideband signal $f_c$ = frequency of the reinserted carrier (equivalent to the frequency to which the receiver is tuned)

When the receiver is accurately tuned to any one of the plurality of discrete frequencies to which it is tunable, the frequency of the reinserted carrier will align with one of the spectral lines, $f_n$, of harmonic signals components produced in a pulsed signal having a frequency equal to the frequency separation between adjacent discrete frequencies.

Figure 1:
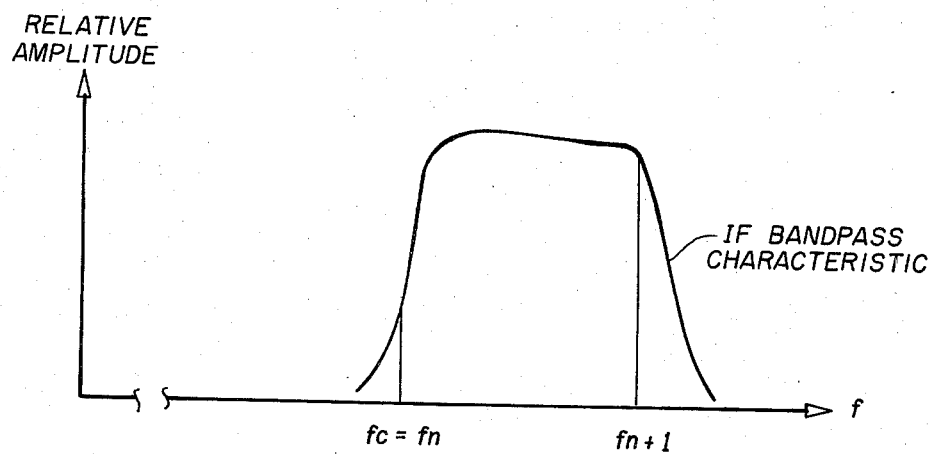
FIG. 1 is an illustration of typical bandpass characteristics of a single sideband receiver such as may be tested through the use of the present invention.

FIG. 1 illustrates typical IF response characteristics of a type of receiver which may advantageously employ the concept of the present invention. The receiver IF bandpass characteristic of FIG. 1 shows typical response in terms of the relative amplitude of output signal developed by the receiver at the frequencies $f_n$ and $f_{n+1}$. In all such type of receivers it is important, as can readily be appreciated, that the IF bandpass characteristics are of a spectral breadth which will produce maximum output over a frequency range equal to, or more than, the frequency separation between the discrete frequencies to which the receiver is tunable. It should be noted that the $f_{n+1}$ sideband, when demodulated, will produce exactly the predetermined frequency such as the 1000Hz tone previously cited for illustrative purposes.

However, when the receiver is tuned to a frequency which differs from any one of the plurality of discrete frequencies, $f_c$ will not equal $f_n$, and the output frequency produced by the receiver will not equal the predetermined single frequency such as 1000Hz. Under the conditions described, when the receiver is not quite precisely tuned to one of the plurality of discrete frequencies the receiver will produce an output signal $f_r$, the frequency of which may be expressed as, $$f_r = f_c - (f_n + 1000Hz)$$

which also may be expressed as, $$f_c - f_n = f_r - 1000Hz$$

Thus, the determination of the number of Hz difference between $f_r$ and 1000Hz, for example, is indicative of the number of Hz that the receiver is off tune from one of the plurality of discrete frequencies to which it is tunable.

The concept of the present invention contemplates that such difference in frequency may be determined by impressing an appropriate signal on the input to the receiver under test and then arranging for a frequency discriminating means to receive the output of the receiver under test for producing an amplitude of signal indicative of the degree to which the receiver is mistuned.

Figure 2:
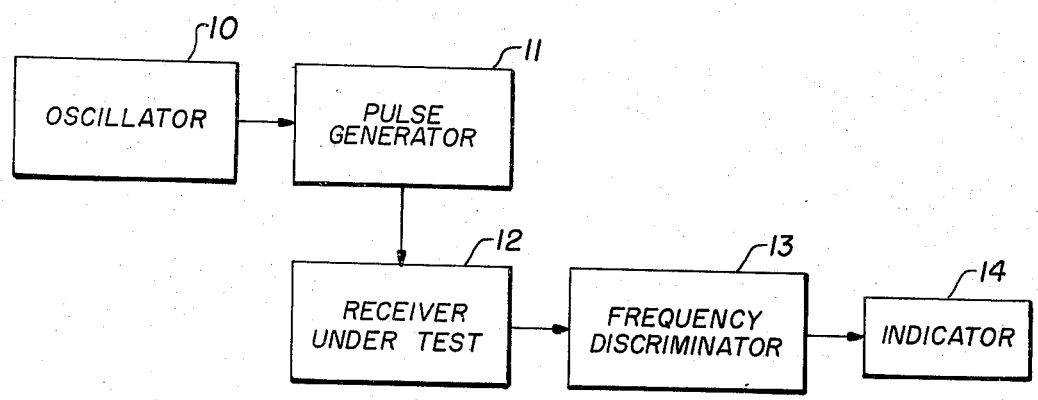
FIG. 2 is a schematic block diagram of an embodiment of the present invention.

In accordance with the concept and the teaching of the present invention, a source for producing signals of a frequency equal to the frequency separation between adjacent discrete frequencies to which the receiver is tunable is provided. Such a source may take the form of an oscillator 10 as illustrated in FIG. 2. The signals produced by the oscillator 10 are connected as the input to a pulse generator 11 which provides sharply pulsed signals of the same frequency as those produced by the oscillator 10. The pulse signal output of pulse generator 11 is impressed upon the receiver under test 12 as its input, such as may be developed at an antenna terminal, for example.

The output of the receiver under test 12 is connected to a frequency discriminating means 13 which is operative to produce a signal having an amplitude commensurate with the deviation of the frequency of its received signal relative to the frequency of a predetermined signal which is indicative of accurate tuning of the receiver to any one of the plurality of discrete frequencies to which it is tunable.

The output of the frequency discriminating means 13 is connected to a suitable indicator 14 for producing a visual analog presentation of the degree to which the receiver is mistuned. Preferably the indicator 14 may be calibrated in terms of frequency deviation, a zero deviation indicating that the receiver is accurately and exactly tuned to one of the plurality of discrete frequencies to which it may be selectively tuned. It will also be apparent to those skilled in the art that other suitable forms of readout indicators may be employed to provide immediate and direct visual indication of the instantaneous tuning of the receiver as desired.

Moreover, the concept and teaching of the present invention lends itself readily adaptable to automatic testing techniques whereby the instantaneous tuning of the receiver of the type previously described may be instantaneously and automatically indicated to guide suitable corrective measures.

Additionally, it will be apparent to those skilled and knowledgeable in the pertinent art that the present invention because of its concept is relatively simple in implementation lending itself advantageously to the use of solid state integrated circuitry techniques enhancing its reliability while yet requiring minimum space.

Further, inherent in the concept of the present invention is the advantageous feature by reason of which signals are developed at each one of the plurality of discrete frequencies to which the receiver is tunable, therefore obviating the need to laboriously tune a signal generator to each of such plurality of discrete frequencies in order to determine the degree of mistuning of the receiver relative to any one of such plurality of discrete frequencies.

The concept of the present invention also desirably obviates the need for relatively expensive and complex components such as frequency meter movements, for instance.

Obviously many modifications and variations of the present invention are possible in the light of the above teachings. It is therefore to be understood that within the scope of the appended claims the invention may be practiced otherwise than as specifically described.

What is claimed is:

1. A system for the determination of small tuning errors of SSB and CW receivers, comprising:
    a receiver under test tunable to a plurality of discrete frequencies differing by an identical frequency separation between adjacent discrete frequencies, and having an IF bandpass at least equal to said frequency separation which is operative to produce an output at the separation frequency when the receiver is accurately tuned to any one of said plurality of discrete frequencies;
    a source for producing signals of a frequency equal to said frequency separation;
    a pulse generator connected to receive said signals and responsive thereto for developing pulses at the same frequency,
    said pulses being impressed upon said receiver as its input signals;
    frequency discriminating means connected to receive the output of said receiver for producing a signal as a function of the frequency deviation of the instantaneous output of said receiver relative to said predetermined frequency; and
    means for indicating the amplitude of the signal produced by said frequency discriminating means, whereby to determine the degree of tuning error of said receiver under test.

2. A system for the determination of small tuning errors of SSB receivers as claimed in claim 1 wherein said single predetermined frequency is in the audio range.

3. A system for the determination of small tuning errors of SSB receivers as claimed in claim 1 wherein said means for indicating the amplitude of the signal produced by said frequency discriminating means is a meter calibrated to display said frequency deviation of the instantaneous output of said receiver under test.

4. A method for determining small tuning errors of SSB receivers which are tunable to a plurality of discrete frequencies differing by an identical frequency separation between adjacent frequencies, and operative to produce an output at a single predetermined frequency when accurately tuned to any one of the plurality of discrete frequencies, comprising the steps of;
    generating pulse signals at the frequency of the frequency separation between adjacent discrete frequencies;
    impressing the pulse signals upon the input of the receiver under test;
    determining the deviation of the output frequency of the receiver from the predetermined frequency;
    displaying the frequency deviation as a measure of tuning error of the receiver under test.

\* \* \* \* \*